(12) United States Patent
Chen et al.

(10) Patent No.: US 7,831,847 B2
(45) Date of Patent: Nov. 9, 2010

(54) INTEGRATED CIRCUIT WITH POWER CONTROL AND POWER CONTROL METHOD THEREOF

(75) Inventors: Wei-Jen Chen, Hsinchu (TW); Chien-Chung Chen, Taipei Hsien (TW); Hung-Der Lin, Taipei (TW); Siou-Shen Lin, Taipei County (TW); Ching-hsiang Liao, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 708 days.

(21) Appl. No.: 11/744,898

(22) Filed: May 7, 2007

(65) Prior Publication Data

US 2008/0282100 A1 Nov. 13, 2008

(51) Int. Cl.
*G06F 1/00* (2006.01)
*G06F 1/26* (2006.01)
*G06F 1/32* (2006.01)

(52) U.S. Cl. ............... 713/300; 713/320; 713/322; 713/323

(58) Field of Classification Search ............ 713/300, 713/320, 323, 322
See application file for complete search history.

(56) References Cited

U.S. PATENT DOCUMENTS

| 6,523,127 | B1 | 2/2003 | Takasu | |
|---|---|---|---|---|
| 6,803,784 | B2 | 10/2004 | Hsu et al. | |
| 2002/0078391 | A1 | 6/2002 | Yeh | |
| 2002/0135398 | A1* | 9/2002 | Choi et al. | 326/93 |
| 2004/0076062 | A1* | 4/2004 | Ueda et al. | 365/222 |
| 2004/0103343 | A1* | 5/2004 | Wu et al. | 714/14 |
| 2004/0210781 | A1* | 10/2004 | Ueda | 713/300 |
| 2005/0254647 | A1 | 11/2005 | Anandakumar et al. | 380/42 |
| 2006/0075267 | A1* | 4/2006 | Tokue | 713/300 |
| 2007/0106916 | A1* | 5/2007 | Yanagawa | 713/300 |
| 2008/0162969 | A1* | 7/2008 | Royannez et al. | 713/323 |

FOREIGN PATENT DOCUMENTS

CN 1746815 3/2006

OTHER PUBLICATIONS

English language translation of abstract of CN 1746815 (published Mar. 15, 2006).

* cited by examiner

*Primary Examiner*—Vincent T Tran
(74) *Attorney, Agent, or Firm*—Thomas, Kayden, Horstemeyer & Risley

(57) ABSTRACT

Power management methods for integrated circuits are disclosed. A system core block is disposed in a chip and comprises a central processing unit. A power control block is disposed in the chip and comprises a power management mechanism coupled to a power supply to control the supply of power to the system core block. The power management mechanism outputs a power down signal and stops supply of power to the system core block according to a power saving mode setting signal from the central processor unit and starts the supply of power to the system core block according to a power saving mode release signal.

9 Claims, 6 Drawing Sheets

INTEGRATED CIRCUIT WITH POWER CONTROL AND POWER CONTROL METHOD THEREOF

BACKGROUND OF THE INVENTION

1. Field of the Invention

The invention relates to integrated circuits having a power control block and a power control method thereof.

2. Description of the Related Art

In many systems utilizing processors, particularly microprocessors, minimal system power consumption is desirable. Methods to achieve this end typically seek to reduce power consumption in the controlling processor as well as any peripherals, as the processor often consumes a significant portion of the total system power.

Conventional methods conserve system power by turning off peripherals that are not currently in use. Simply turning off peripherals, however, does not minimize power consumption of the processor, as it typically continues to operate. Moreover, power consumption continues to increase with the continual miniaturization of semiconductor integrated circuits and increases in operating frequency. In integrated circuits fabricated by deep sub-micron process technologies, in particular, leakage has exceeded 30% or more of the total system power consumption.

Power consumption can, for example, be represented as:

$$E = \int_0^t (C \times V_{DD}^2 \times f_C + V_{DD} \times I_{lkg}) dt$$
$$= \int_0^t (C \times V_{DD}^2 \times f_C) dt + \int_0^t (V_{DD} \times I_{lkg}) dt$$

Accordingly, total power consumption can comprise dynamic power consumption affected by power voltage $V_{DD}$ and operating frequency $f_c$ and leakage power consumption affected by power voltage $V_{DD}$.

US patent application publication (NO. 2002/0078391) discloses a system that runs at a very low frequency clock rate in power saving mode compared to that in normal mode. Namely, it utilizes frequency scaling to reduce power consumption. This system, however, is hindered by dynamic power consumption and leakage power consumption because the dynamic power consumption can only be partially reduced.

U.S. Pat. No. 6,803,784 discloses a microprocessor, a clock of which stops in power saving mode. Namely, the microprocessor utilizes a stopped clock to reduce power consumption. This microprocessor, however, suffers from leakage power consumption because only the dynamic power consumption can be reduced. Further, leakage current increases with larger die size and deeper sub-micron processes, thus, dynamic power consumption is increased.

U.S. Pat. No. 6,523,127 discloses an external microcontroller controlling the power supplied to every chip in the entire system to reduce power consumption. This method, however, requires an external microcontroller and still consumes power.

Thus, more efficient power control is desirable.

BRIEF SUMMARY OF THE INVENTION

A detailed description is given in the following embodiments with reference to the accompanying drawings.

Integrated circuits are provided. An exemplary embodiment of an integrated circuit comprises a system core block disposed in a chip and a central processing unit (CPU). The integrated circuit further comprises a power control block disposed in the chip and a power management mechanism coupled to a power supply to control the supply of power to the system core block.

Electronic systems comprising the disclosed integrated circuit are provided. An exemplary embodiment of an electronic system comprises a power supply powering the disclosed integrated circuit, and a storage unit coupled to the integrated circuit, storing programs executable by an operating system via CPU in the integrated circuit at system startup.

Power control methods for an integrated circuit are provided. In an exemplary embodiment of a power control method for an integrated circuit, the integrated circuit in a chip is divided into a system core block and a power control block. The system core block is powered by a first voltage from a power supply and comprises a central processing unit (CPU). A second voltage provided via power supply, powers the power control block. A power management mechanism disposed in the power control block stops supply of the first voltage to the system core block according to a power saving mode signal from the CPU, thus, a power saving mode entered.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
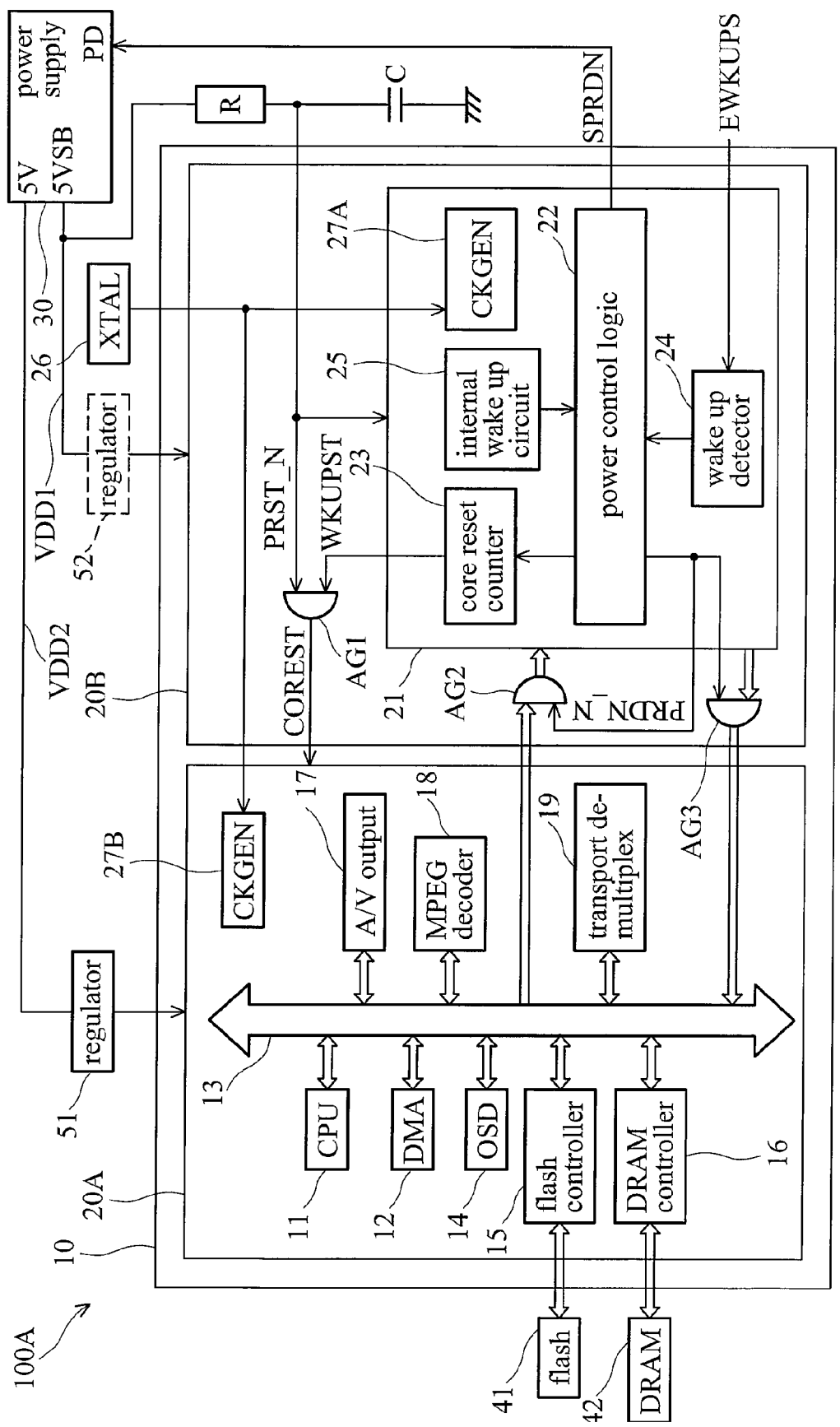
FIG. 1 shows an embodiment of an electronic system according to the invention.

FIG. 1 shows an embodiment of an electronic system according to the invention. The electronic system 100A can be employed in digital cameras, digital video recorders (DVRs), consumer or office appliances, cell phones, PDAs, or other handheld devices as well as robots or toys, but is not limited thereto. As shown, the system 100A comprises an integrated circuit 10, a power supply 30, a crystal oscillator (XTAL) 26, a flash memory 41, a dynamic random access memory (DRAM) 42 and regulators 51 and 52.

The integrated circuit 10 comprises at least two blocks, one is a system core block 20A and the other is a power control block 20B. For example, the system core block 20A, the power control block 20B, as well as the flash memory 41 and the DRAM 42 can be integrated in the same chip as integrated circuit 10. The system core block 20A and the power control block 20B in the integrated circuit 10 are powered via voltages VDD2 and VDD1 respectively, and the voltages VDD1 and VDD2 can, for example, be 5 VSB and 5V respectively, but are not limited thereto.

The system core block 20A is designed to provide multiple functions according to different commands and comprises a central processing unit 11, a direct memory access (DMA) controller 12, a system bus 13, an on screen display (OSD) controller 14, a flash controller 15, a DRAM controller 16, a A/V output circuit 17, a MPEG decoder 18, a transport de-multiplexer 19 and a clock generator 27B.

The central processing unit 11 is coupled to the direct memory access controller 12, the OSD controller 14, the flash controller 15, the DRAM controller 16, the A/V output circuit 17, the MPEG decoder 18 and the transport de-multiplexer 19 through the system bus 13. The CPU 11 performs computational routines and controls the entire system based on a program, and can also be replaced by a microprocessing unit (MPU), a digital signal processor, a microcontroller or multiple processing units but is not limited thereto. In this embodiment, the system 100A can be operated in a normal mode, a power saving (sleep) mode, or the like. For example, in power saving mode, the CPU 11 outputs control signals to the power control block 20B, such that the power control block 20B stops the power supply 30 from powering the system core block 20A.

The flash controller 15 is used to couple the flash memory 41 to the system bus 13. The flash memory 41 stores programs executable by an operating system at system startup. The DRAM controller 16 couples the DRAM 42 to system bus 13. The DRAM 42 stores application programs and intermediate processing data. The clock generator 27B generates clocks applicable to the system core block 20A based on the received oscillation signals.

The power control block 20B coupled between the system core block 20A and the power supply 30 controls power supplied to the system core block 20A. For example, the power control block 20B stops supply of power to system core block 20A according to control signals from the CPU 11 to reduce power consumption. As shown, the power control block 20B comprises control unit 21 and AND gates AG1~AG3. The control unit 21 comprises a power control logic circuit 22, a core reset counter 23, a wake up detector 24, an internal wake up circuit and a clock generator 27A.

The power control logic circuit 22 provides a power down signal SPRDN and a control signal PWDN_N according to the operating mode of the electronic system 100A, and triggers the core reset counter 23 to output a reset signal WKUPST for resetting the system core block 20A. For example, the power control logic circuit 22 sets the power down signal SPRDN to a high level from a low level upon receiving a power saving mode setting signal. The power down signal SPRDN is set to the low level from the high level upon receiving a power saving mode release signal from CPU 11 via system bus 13.

Note that the power control logic circuit 22 is a digital logic circuit composed of logic gates comprising AND gates, OR gates, NOT gates, NAND gates, NOR gates and/or EX-OR gates, rather than a microprocessing unit (MPU), a digital signal processor, a microcontroller, a central processing unit, or a microprocessor that can execute instructions or commands programmed in a program stored in a storage device, such as flash memory or DRAM. In this embodiment, the CPU 11 in the system core block 20A outputs a control signal to the power control block 20B, such that the power control logic circuit 22 controls the power supply 30 to stop supplying power to the system core block 20A. Namely, the CPU 11 is powered down via power control logic circuit 22 in the same integrated circuit 11 rather than by an external component outside of the integrated circuit 11.

The core reset counter 23 is triggered via power control logic circuit 22 to output the reset signal WKUPST, such that the AND gate AG1 outputs a core reset signal COREST, thereby resetting the system core block 20A when the power saving mode release signal has been detected. Further, when the power supply 30 is turned on, the voltage VDD1 charges the capacitor C to generate a power reset signal PRST_N, such that the AND gate AG1 outputs the core reset signal COREST thereby resetting the system core block 20A.

The wake up detector 24 and the internal wake up circuit 25 generate the power saving mode release signal, directing the power control logic circuit 22 to set the power down signal SPRDN to the low level and the power supply 30 restores the supply of power to the system core block 20A, i.e. the power supply 30 again provides the voltage VDD2 to the system core block 20A. For example, the wake up detector 24 generates the power saving mode release signal according to the external wake up signal EWKUPS from external components outside of integrated circuit 10. The internal wake up circuit 25 generates the power saving mode release signal according to the internal wake up signals generated by internal components in the integrated circuit 10. Alternatively, the CPU sets at least one predetermined condition for the wake up detector 24 and the internal wake up circuit 25 before enters power saving mode, and the wake up detector 24 or the internal wake up circuit 25 generates the power saving mode release signal to the power control logic circuit 22 when the predetermined condition set via CPU 11 is satisfied, thus, power supply 30 restores the supply of power to the system core block 20A.

The crystal oscillator 26 generates oscillating signals to the clock generators 27A and 27B in the system core block 20A and the power control block 20B respectively. In this embodiment, the crystal oscillator 26 outputs the oscillation signals to the power control block 20B first, and then the power control block 20B delivers the received oscillation signals to the clock generator 27A therein and the clock generator 27B in the system core block 20A. The clock generator 27A generates applicable clocks for the power control block 20B based on the received oscillating signal. The AND gates AG2 and AG3 prevent malfunctions caused by floating between the system bus 13 and the control unit 21 according to the control signal PRDN_N.

The power supply 30 selectively powers the integrated circuit 10 according to the control of the power control logic circuit 22 in the integrated circuit 10. For example, the power supply 30 outputs the voltages VDD1 and VDD2 when the power down signal SPRDN is at low level (disabled) and outputs the voltage VDD1 when the power down signal SPRDN is at high level (enabled). Namely, the power supply 30 outputs the voltages VDD2 and VDD1 to power the system core block 20A and the power control block 20B respectively when turned on. When the power down signal SPRDN is disabled via power control logic circuit 22 in the power saving mode, the power supply 30 stops outputting the voltage VDD2 to the system core block 20A and maintains to output the voltage VDD1 to the power control block 20B. Further, because the power supply 30 outputs the voltage VDD1 in power saving mode or normal mode, the power reset signal PRST_N can be maintained at high level until the power supply 30 is turned off. In addition, the voltages VDD1 and VDD2 from the power supply 30 are regulated to applicable voltages via regulators 51 and 52 for powering the system core block 20A and the power control block 20B.

Figure 2:
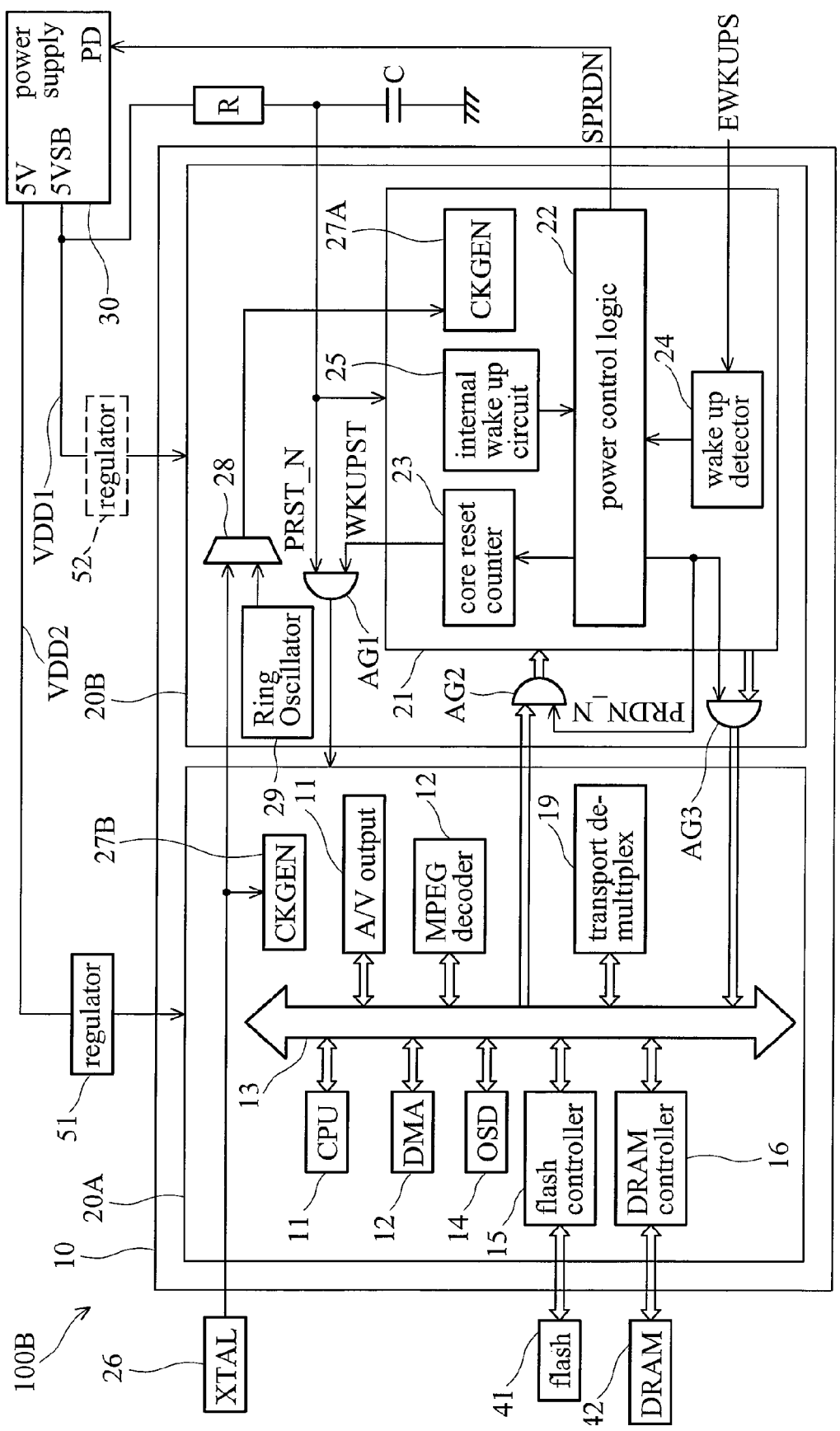
FIG. 2 shows another embodiment of an electronic system according to the invention.

FIG. 2 shows another embodiment of an electronic system. As shown, the electronic system 100B is similar to the system 100A shown in FIG. 1 with the exception of the crystal oscillator 26, a multiplexer 28 and a ring oscillator 29. The crystal oscillator 26 outputs oscillation signals to the clock generator 27B in the system core block 20A and the multiplexer 28 in the power control block 20B. In this embodiment, the crystal oscillator 26 outputs the oscillating signals to the system core block 20A first, and then the power control block 20B delivers the received oscillation signals to the clock generator 27B therein and the multiplexer 28 in the power control block 20B. The ring oscillator 29 generates and outputs oscillation signals to the multiplexer 28, and the multiplexer 28 selectively outputs the oscillation signals from crystal oscillator 26 or the oscillation signals from the ring oscillator 29 via CPU 11. For example, when system 100 operates in normal mode, the CPU sets the multiplexer 28 to output the oscillation signals from crystal oscillator 26 to the clock generator 27A such that the clock generator 27A generates applicable clocks for the power control block 20B based on the received oscillation signal. Alternatively, the CPU 11 sets the multiplexer 28 to output the oscillation signals from ring oscillator 29 to the clock generator 27A before enters power saving mode, such that the clock generator 27A generates applicable clocks for the power control block 20B based on the oscillation signal from the ring oscillator 29 when in power saving mode. Description of structures and operations identical to those of system 100A is omitted for simplicity.

Figure 3:
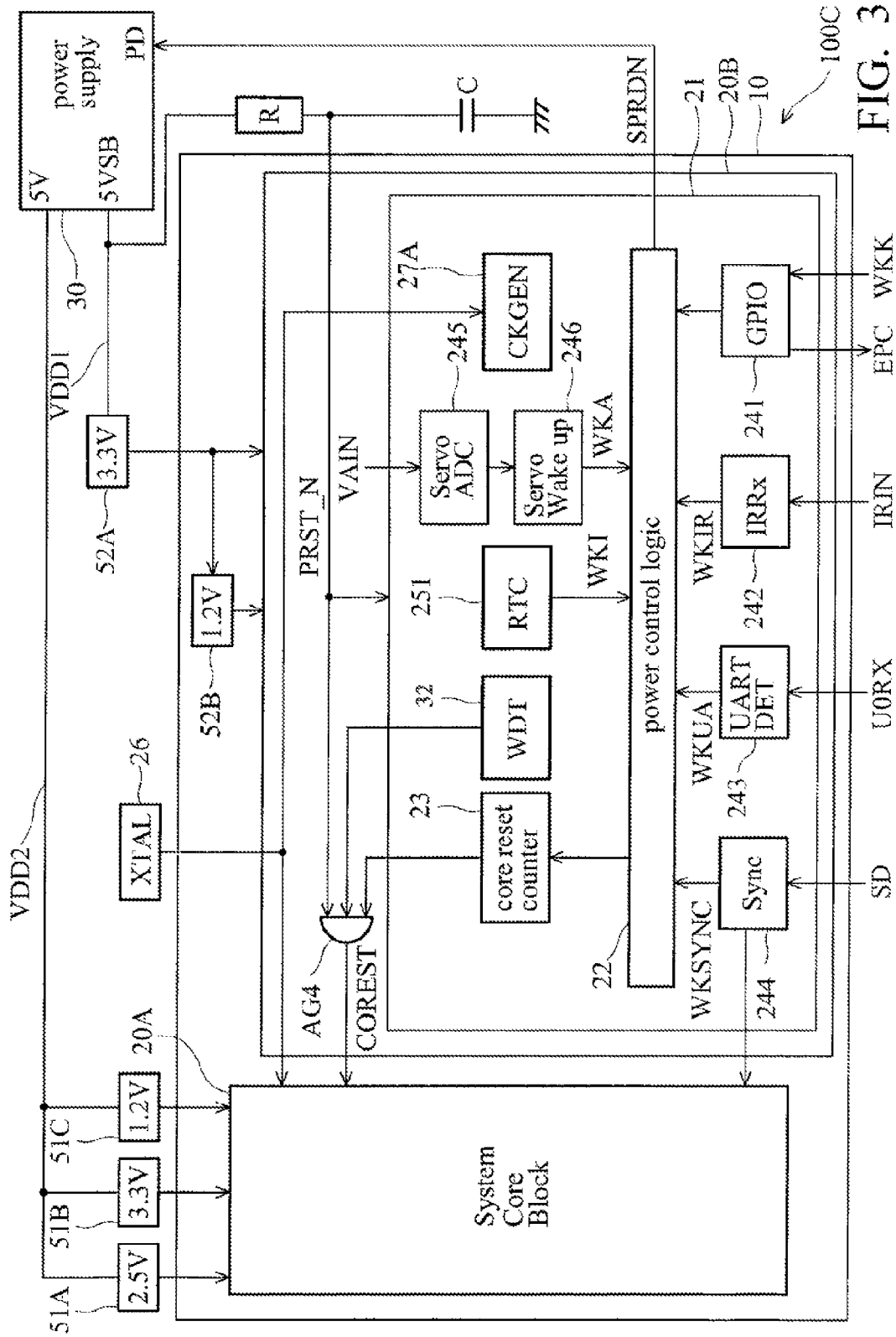
FIG. 3 shows another embodiment of an electronic system according to the invention.

FIG. 3 shows another embodiment of an electronic system. As shown, the electronic system 100C is similar to the system 100A shown in FIG. 1 with the exception of the regulators 51A-51C and 52A-52B and the control unit 21. Description of structures and operations of system core block 20A and power supply 30 identical to those of system 100A are omitted for simplicity. The control unit 21 comprises the power control logic circuit 22, general purpose input/output (GPIO) ports 241, IR receiver 242, an universal asynchronous receiver transmitter (UART) detector 243, a synchronization signal detector 244, a servo analog-to-analog converter (ADC) 245, a servo wake up unit 246, a real time counter 251, a watchdog timer 32 and the core reset counter 23. For example, the general purpose input/output (GPIO) ports 241, IR receiver 242, an universal asynchronous receiver transmitter (UART) detector 243, a synchronization signal detector 244, a servo analog-to-digital converter (ADC) 245, a servo wake up unit 246 can be regarded as the wake up detector 24 shown in FIGS. 1 and 2.

The AND gate AG4 is coupled to the watchdog timer 32 and core reset counter 23. Core reset counter 23 outputs the core reset signal COREST to reset the system core block 20A according to the power reset signal PRST_N and the output of the watchdog timer 32 and the core reset counter 23. For example, the AND gate AG4 outputs the core reset signal COREST to reset the system core block 20A according to the power reset signal PRST_N when the power supply 30 is turned on. Alternatively, the AND gate AG4 outputs the core reset signal COREST to reset the system core block 20A according to the output of the core reset counter 23 when the system 100C enters normal mode from power saving mode. Namely, the power control logic circuit 22 triggers the core reset counter 23 such that the AND gate AG4 outputs the core reset signal COREST when the system 100C enters normal mode from power saving mode.

The GPIO ports 241 are coupled between the power control logic circuit 22 and external components (not shown) coupled to the integrated circuit 10. The CPU 11 in the system core block 20A can execute an external IC power control on the external components before system 100C enters power saving mode. For example, the CPU 11 turns off the external components by an external power control signal EPC before system 100C enters power saving mode. In addition, the external component can be a keypad, and the CPU 11 sets a power key of the keypad before system 100C enters power saving mode. When the keypad (not shown) outputs a keypad wake up signal WKK to the power control logic circuit 22 through the GPIO ports 241, the power control logic circuit 22 sets the power down signal SPRDN to the lower level to wake up the system.

The IR receiver 242 is coupled between an external IR device (not shown) and the integrated circuit 10 for IR transmission therebetween, and outputs a wake up signal WKIR to trigger the power control logic circuit 22 to disable the power down signal SPRDN. For example, before system 100C enters power saving mode, the CPU 11 in the system core block 20A writes or sets specific IR codes to IR receiver 242. When the IR receiver 242 finds that the received IR codes in the IR signal IRIN are the same as the codes set by the CPU 11, IR receiver 242 outputs a wake up signal WKIR to direct (trigger) the power control logic circuit 22 to disable the power down signal SPRDN such that the system core block 20A is again powered by power supply 30.

The UART detector 243 detects a specific communication signal U0RX on a communication port and outputs a wake up signal WKUA to trigger the power control logic circuit 22 to disable the power down signal SPRDN upon detecting the specific communication signal U0RX. For example, the communication port can be a RS232 port, but is not limited thereto. When the UART detector 243 detects a specific communication signal on the RS232 port, the UART detector 243 outputs wake up signal WKUA directing power control logic circuit 22 to disable the power down signal SPRDN such that the system core block 20A is powered by power supply 30. Namely, the electronic system 100C can be woken up by remote control through communication ports.

The synchronization signal detector 244 detects a display control signal SD coupled to the integrated circuit 10, and outputs a wake up signal WKSYNC to trigger the power control logic circuit 22 to disable the power down signal SPRDN upon detecting the display control signal SD. For example, the display control signal SD can be a TV signal, horizontal synchronization signal Hsync or vertical synchronization signal Vsync for display devices or the like. Before system 100C enters power saving mode, the CPU 11 in the system core block 20A writes or sets specific conditions corresponding to the display control signal SD to the synchronization signal detector 244. When the synchronization signal detector 244 detects the display control signal SD is set or defined by CPU 11, the synchronization signal detector 244 outputs the wake up signal WKSYNC to direct the power control logic circuit 22 to disable the power down signal SPRDN such that the system core block 20A is again powered by power supply 30.

The servo ADC 245 receives analog inputs VAIN, such as analog voltages, and converts the inputs to corresponding digital codes for output to the servo wake up unit 246. Before system 100C enters power saving mode, the CPU 11 in the system core block 20A writes specific codes to the servo wake up unit 246. When the servo wake up unit 246 detects that a corresponding digital code from the servo ADC 245 is the same as code written or set by CPU 11, the servo wake up unit 246 outputs a wake signal WKA directing power control logic circuit 22 to disable the power down signal SPRDN such that the system core block 20A is again powered by power supply 30.

Namely, the keypad wake up signal WKK received by GPIO ports 241, the IR signal TRIN received by IR receiver 242, the specific communication signal UORX received by UART detector 243, the display control signal SD received by synchronization signal detector 244 and the analog inputs VAIN received by servo ADC 245 can serve as the external wake up signal EWKUPS.

The real time counter 251 can serve as the internal wake up circuit 25 shown in FIG. 1, and can be reserved output a wake up signal WKI for triggering the power control logic circuit 22 to disable the power down signal SPRDN. For example, before system 100C enters the power saving mode, the CPU 11 in the system core block 20A can set a time reservation for the real time counter 251. When the real time counter 251 detects that the time set by CPU 11 is reckoned (counted), the real time counter 251 outputs the wake up signal WKI to directing power control logic circuit 22 to disable the power down signal SPRDN such that the system core block 20A is again powered by power supply 30. Namely, electronic system 100C can be woken up by an internal circuit of integrated circuit 10 rather than by an external circuit outside integrated circuit 10. For example, the wake up signals WKK, WKIR, WKUA, WKSYNC and WKA from the GPIO port 241, IR receiver 242, UART detector 243, the synchronization signal detector 244 and the servo wake up unit 246 and the wake up signal WKI from the real time counter 251 can serve as the power saving mode release signal.

Figure 4:
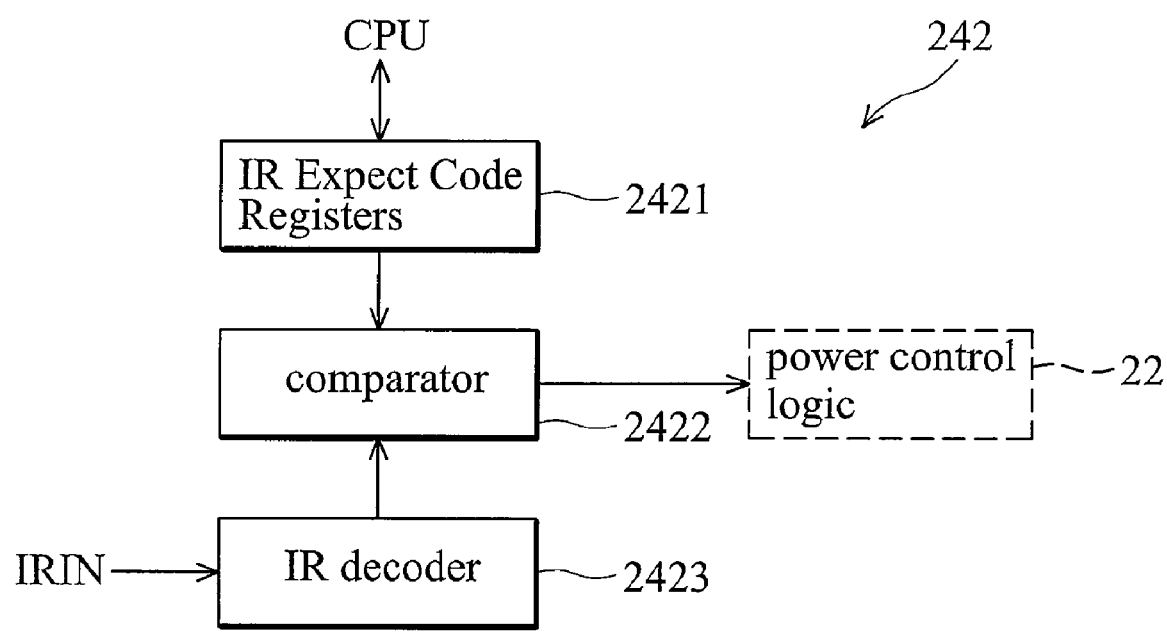
FIG. 4 shows an embodiment of an IR detector according to the invention.

FIG. 4 shows an embodiment of an IR detector. As shown, the IR receiver 242 is coupled to the CPU 11 to receive IR input signals IRIN from external IR devices, and comprises IR expected code registers 2421, a comparator 2422 and an IR detector 2423. The IR expected code registers 2421 is coupled to the CPU 11 via system bus 13 for storing IR expected codes, and the IR decoder 2423 receives and decodes the IR input signal IRIN to corresponding IR codes accordingly. For example, the CPU 11 in the system core block 20A writes specific IR codes serving as IR expect code to IR expected code registers 2421 before system 100C enters power saving mode.

The comparator 2422 compares the IR expected codes stored in the IR expected code registers 2421 and the decoded IR codes from the IR decoder 2423, and outputs the wake up signal WKIR to direct the power control logic circuit 22 to disable the power down signal SPRDN when the decoded IR codes from the IR decoder 2423 are the same as the IR expected codes in the IR expected code registers 2421 written by CPU 11.

Figure 5A:
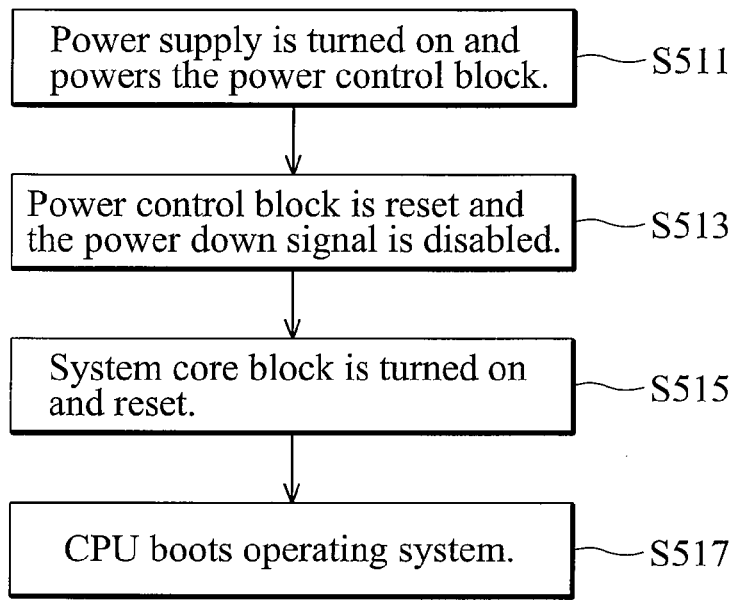
FIGS. 5A, 5B and 5C are flowcharts illustrating an embodiment of a power control method for electronic systems.
Figure 5B:
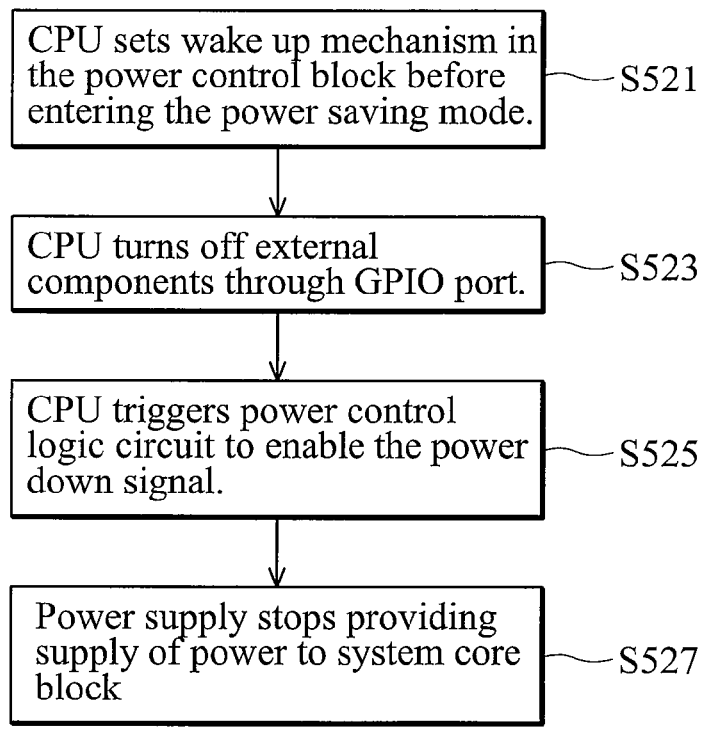
Figure 5C:
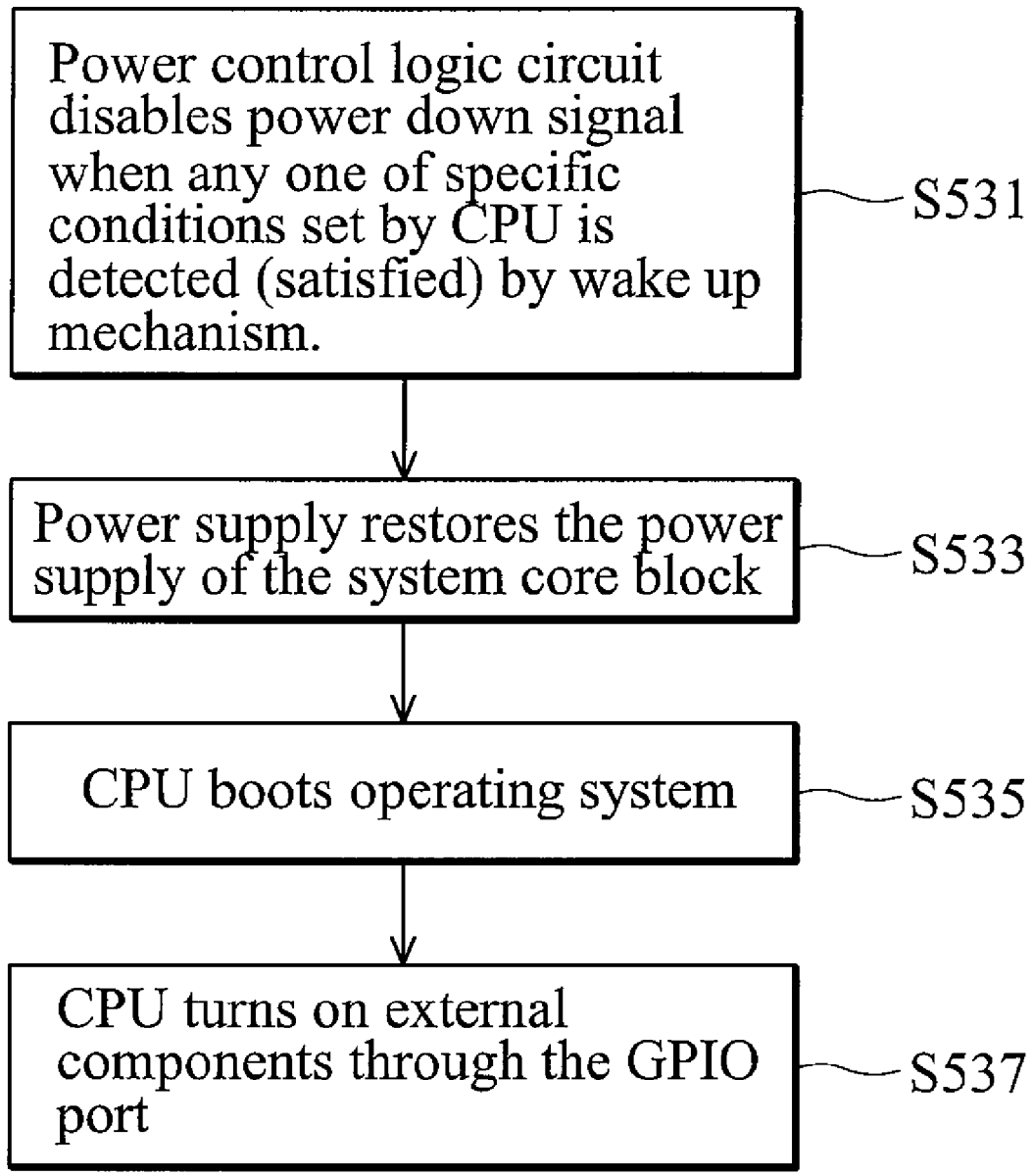

FIGS. 5A, 5B and 5C are flowcharts illustrating an embodiment of a power control method for electronic systems. In this method, the electronic system 100A, 100B or 100C can be operated in a normal mode and a power saving mode. The method begins by a power on flow comprising actions including steps S511 to S517 as shown in FIG. 5A to initialize the electronic system and enter the normal mode. The power saving (power down) flow comprises actions including steps S521~S527 shown in FIG. 5B, such that the electronic system enters the power saving mode for reducing power consumption. The power saving wake up flow comprises actions including steps S531~S539 shown in FIG. 5C, such that the electronic system returns to the normal mode from the power saving mode.

In step S511, the power supply 30 is turned on and provides the voltage VDD1 to the power control block 20B. The voltage on the capacitor C is charged by voltage VDD1 and the voltage stored in the capacitor C serves as a power reset signal PRST_N.

In step S513, the power control block 20B is reset by the power reset signal PRST_N, and the power down signal SPRDN is disabled. For example, the power control logic circuit 22 disables the power down signal SPRDN after being reset, i.e. the power down signal SPRDN is set to a low level. Because the power down signal SPRDN is disabled (set to the low level), the power supply 30 provides the voltage VDD2 to the system core block 20A.

In step S515, when receiving the voltage VDD2 from the power supply 30, the system core block 20A is turned on. The power control logic circuit 22 then triggers the core rest counter 23 to output the reset signal WKUPST, but the core reset counter 23 triggers the AND gate AG1 to output a core reset signal COREST after a time delay, such that the system core block 20A can be reset after being powered by power supply 30.

In step S517, the CPU 11 executes programs stored in the flash memory 41 to boot operating system. Thus, the electronic system enters a normal mode.

When the CPU 11 executes a power saving (down) mode command, the power saving (power down) flow comprises actions including steps S521~S527 shown in FIG. 5B is performed, such that the electronic system enters the power saving mode for reducing power consumption.

In step S521, the CPU 11 sets the wake up mechanism in the power control block 20B before entering the power saving mode. For example, the CPU 11 can set specific conditions for the wake up mechanism, and the wake up mechanism generates power saving mode release signals to wake up the electronic system when one of the specific conditions is satisfied.

In some embodiments, the wake up mechanism comprises an internal wake up mechanism, such as internal wake up circuit 25 shown in FIGS. 1 and 2, and an external wake up mechanism, such as wake up detector 24 shown in FIGS. 1 and 2. The wake up detector 24 can generate power saving mode release signals according to external wake up signals EWKUPS from external components outside of the integrated circuit 10, and the internal wake up circuit 25 generates the power saving mode release signals by internal components in the integrated circuit 10. Namely, the CPU 11 sets specific conditions for the wake up detector 24 and the internal wake up circuit 25, thereby waking up the electronic system when one of the specific conditions set by CPU 11 is satisfied.

As shown in FIG. 3, the wake up detector 24 can, for example, comprise a GPIO port 241, an IR receiver 242, a UART detector 243, a synchronization signal detector 244, a servo ADC 245 and a servo wake up unit 246 to generate power saving mode release signals to wake up electronic system according to external wake up signals EWKUPS. For example, the CPU 11 sets power keys of external components (such as a keypad) through the GPIO port 241, writes specific IR codes to the IR receiver 242, defines a specific display signal to the synchronization signal detector 244 and/or writes specific digital codes corresponding to analog voltages to the servo wake up unit 246 before entering power saving mode. For example, the CPU 11 can set some IR specific IR codes serving as the IR expect code to the IR expected code registers 2421 as shown in FIG. 4.

The internal wake up circuit 25 can, for example, comprise a real time counter (RTC) 251 shown in FIG. 3 thereby generating power saving mode release signals to wake up electronic system by time reservation. In this case, the CPU 11 can reserve a time for the real time counter 251 before entering power saving mode. Note that the wake up mechanism detects the specific conditions set by CPU 11, such as the power key of the keypad, specific IR codes, the specific display signal, the specific digital codes corresponding to analog voltages and/or the time reservation defined, set or written by CPU 11. When any one of the specific conditions set by CPU 11 is detected (satisfied), the wake up mechanism generates power saving mode release signals to wake up the electronic system.

In step S523, the CPU 11 turns off external components, such as integrated circuits, coupled to the integrated circuit 11 through the GPIO port 241 (shown in FIG. 3). For example, the CPU 11 output an external power control signal EPC to turn off the external components before system 100C enters power saving mode. In the embodiment of FIG. 2, the CPU 11 further sets the multiplexer 28 such that the oscillation signals generated by ring oscillator 29 are output to the clock generator 27A. Thus, the clock generator 27A can generate applicable clocks for the power control block 20B by oscillation signals generated by ring oscillator 29 when the crystal oscillator 26 is turned off during the power saving mode.

In step S525, the CPU 11 triggers the power control logic circuit 22 to enable the power down signal SPRDN. For example, the power control logic circuit 22 sets the power down signal SPRDN to a high level from the low level.

In step S527, the power supply 30 stops providing the voltage VDD2 to the system core block 20A because the power down signal SPRDN is enabled, meanwhile the power supply 30 still provides the voltage VDD1 to the power control block 20B. Thus, the electronic system enters the power saving mode.

The power saving wake up flow comprises actions including steps S531~S537 shown in FIG. 5C and is performed such that the electronic system returns to the normal mode from the power saving mode.

In step S531, the power down signal SPRDN is disabled (set to the low level from the high level) by power control logic circuit 22 when any one of the specific conditions set by CPU 11 is detected (satisfied) by wake up mechanism. For example, when a keypad wake up signal WKK through the GPIO ports 241 (shown in FIG. 3) from the external components is detected, the power control logic circuit 22 sets the power down signal SPRDN to the lower level to wake up the system.

Alternatively, when UART detector 243 (shown in FIG. 3) detects a specific communication signal on the RS232 port, the UART detector 243 outputs a wake up signal WKUA to direct the power control logic circuit 22 to disable the power down signal SPRDN, or when the synchronization signal detector 244 detects a specific display control signal SD defined by CPU 11, the synchronization signal detector 244 outputs a wake up signal WKSYNC to direct the power control logic circuit 22 to disable the power down signal SPRDN. For example, the specific display control signal SD can be a TV signal, horizontal synchronization signal Hsync or vertical synchronization signal Vsync for display devices and the like.

Further, the servo ADC 245 (shown in FIG. 3) receives and converts analog inputs VAIN, such as analog voltages, to corresponding digital codes for output to the servo wake up unit 246. Before system 100C enters power saving mode, the CPU 11 in the system core block 20A writes specific codes to the servo wake up unit 246. When the servo wake up unit 246 detects that a corresponding digital code from the servo ADC 245 is the same as the code written by CPU 11, the servo wake up unit 246 outputs a wake up signal WKA to direct the power control logic circuit 22 to disable the power down signal SPRDN. Alternatively, when the real time counter 251 (shown in FIG. 3) detects that the time set by CPU 11 is reckoned (counted), the real time counter 251 outputs a wake up signal WKI to direct the power control logic circuit 22 to disable the power down signal SPRDN.

Alternatively, when the IR receiver 242 finds that the received IR codes in the IR signal IRIN is the same as the code set by CPU 11, IR receiver 242 outputs a wake up signal WKIR to direct the power control logic circuit 22 to disable the power down signal SPRDN. For example, the comparator 2422 compares the IR expected codes stored in the IR expected code registers 2421 and the decoded IR codes from the IR decoder 2423, and outputs the wake up signal WKIR to direct the power control logic circuit 22 to set the power down signal SPRDN to the low level when the decoded IR codes from the IR decoder 2423 are the same as the IR expected codes in the IR expected code registers 2421 written by CPU 11.

Namely, the keypad wake up signal WKK received by GPIO ports 241, the IR signal IRIN received by IR receiver 242, the specific communication signal UORX received by UART detector 243, the display control signal SD received by synchronization signal detector 244 and the analog inputs VAIN received by servo ADC 245 can serve as the external wake up signal EWKUPS, and the wake up signals WKK, WKIR, WKUA, WKSYNC and WKA from the GPIO port 241, IR receiver 242, UART detector 243, the synchronization signal detector 244 and the servo wake up unit 246 and the wake up signal WKI from the real time counter 251 can serve as the power saving mode release signal generated by wake up mechanism to wake up the electronic system.

In step 533, the power supply 30 restores the power supply of the system core block 20A, i.e. the power supply 30 provides the voltage VDD2 to the system core block 20A because the power down signal SPRDN is disabled (set to the low level from the high level) by power control logic circuit 22 according to the wake up signals from the wake up mechanism. In addition, the power control logic circuit 22 also triggers the core reset counter 232 in the step 533, but the core reset counter 232 triggers the AND gate AG4 to output the core reset signal COREST after a time delay, such that the system core block 20A can be reset after being powered by power supply 30.

In step 535, the CPU 11 executes programs stored in the flash memory 41 to boot the operating system. Thus, the electronic system returns to the normal mode from the power saving mode.

In step 537, the CPU 11 turns on external components by external power control signal EPC through the GPIO port 241. In addition, the CPU 11 can also reset registers in the power control block 20B if necessary. For example, the CPU 11 resets registers for the wake up mechanism.

In the invention, the system core block 20A including a processor consuming a significant portion of the total system power is powered off without requiring an external microcontroller which still consumes a great amount of power in power saving mode. Because the system core block 20A is powered off, the entire power consumption thereof, such as, dynamic power consumption affected by power voltage $V_{DD}$ and operating frequency $f_c$ and leakage power consumption affected by power voltage $V_{DD}$, can be reduced. Moreover, because power control logic circuit 22 is a digital logic circuit composed of logic gates comprising AND gates, OR gates, NOT gates, NAND gates, NOR gates and/or EX-OR gates, rather than a microprocessing unit (MPU), a digital signal processor, a microcontroller, a central processing unit, or a microprocessor that can execute instructions or commands programmed in a program stored in a storage device, the power consumption of the power control logic circuit 22 is far less than that of a microprocessing unit (MPU), a digital signal processor, a microcontroller, a central processing unit, or a microprocessor. Thus, the power consumption of the electronic system of the invention can be far less than that controlled by microcontroller.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated circuit, comprising:
a system core block disposed in a chip and comprising a central processor unit (CPU),
a power control block disposed in the chip and comprising a power management mechanism coupled to a power supply to control supply of power to the system core block; and
a ring oscillator disposed in the power control block, providing first oscillation signals; and
a selection unit disposed in the power control block, selectively outputting second oscillation signals generated by an external crystal oscillator from the system core block and the first oscillation signals from ring oscillator to generate clocks for the power control block when the power management mechanism receives the power saving mode setting signal.

2. An integrated circuit, comprising:
a system core block disposed in a chip and comprising a central processor unit (CPU),
a power control block disposed in the chip and comprising a power management mechanism coupled to a power supply to control supply of power to the system core block, wherein the CPU sets predetermined wake up conditions to the power management mechanism before entering to a power saving mode, and the power management mechanism generate the power saving mode release signal when at least one of the predetermined wake up conditions set by the CPU is satisfied; wherein the power management mechanism comprises an infrared receiver to receive an infrared signal and generate the power saving mode release signal when the received infrared signal has a code identical to a predetermined code set by the CPU.

3. An integrated circuit, comprising:
a system core block disposed in a chip and comprising a central processor unit (CPU),
a power control block disposed in the chip and comprising a power management mechanism coupled to a power supply to control supply of power to the system core block, wherein the CPU sets predetermined wake up conditions to the power management mechanism before entering to a power saving mode, and the power management mechanism generate the power saving mode release signal when at least one of the predetermined wake up conditions set by the CPU is satisfied; wherein the power management mechanism comprises an universal asynchronous receiver transmitter (UART) detector to detect a communication signal on a communication port coupled to the integrated circuit and generate the power saving mode release signal when the detected communication signal is a predetermined communication signal set by the CPU.

4. An integrated circuit, comprising:
a system core block disposed in a chip and comprising a central processor unit (CPU),
a power control block disposed in the chip and comprising a power management mechanism coupled to a power supply to control supply of power to the system core block, wherein the CPU sets predetermined wake up conditions to the power management mechanism before entering to a power saving mode, and the power management mechanism generate the power saving mode release signal when at least one of the predetermined wake up conditions set by the CPU is satisfied; wherein the power management mechanism comprises a synchronization signal detector to detect a display control signal from outside of the integrated circuit and generate the power saving mode release signal when the detected display signal is a predetermined synchronization signal or a predetermined television signal set by the CPU.

5. An integrated circuit, comprising:
a system core block disposed in a chip and comprising a central processor unit (CPU),
a power control block disposed in the chip and comprising a power management mechanism coupled to a power supply to control supply of power to the system core block, wherein the CPU sets predetermined wake up conditions to the power management mechanism before entering to a power saving mode, and the power management mechanism generate the power saving mode release signal when at least one of the predetermined wake up conditions set by the CPU is satisfied; wherein the power management mechanism comprises:
an analog-to-digital converter (ADC) converting an analog input to a digital code; and
a servo wake up unit generating the power saving mode release signal when the converted digital code from the ADC is identical to a predetermined code set by the CPU.

6. A power control method for an integrated circuit, comprising:
separating the integrate circuit in a chip to a system core block and a power control block, wherein the system core block is powered by a first voltage from a power supply and comprises a central processing unit (CPU), and the power control block is powered by a second voltage from the power supply;
disposing a power management mechanism in the power control block;
stopping supply of the first voltage to the system core block by a power management mechanism in the power control block according to a power saving mode setting signal from the CPU;
entering a power saving mode;
restoring the supply of the first voltage to the system core block according to a power saving mode release signal; and returning to a normal mode from the power saving mode;
setting a predetermined code to the power management mechanism by the CPU;
receiving an infrared signal by a infrared receiver in the power management mechanism; and
generating the power saving mode release signal when the received infrared signal has a code identical to predetermined code.

7. A power control method for an integrated circuit, comprising:
- separating the integrate circuit in a chip to a system core block and a power control block, wherein the system core block is powered by a first voltage from a power supply and comprises a central processing unit (CPU), and the power control block is powered by a second voltage from the power supply;
- disposing a power management mechanism in the power control block;
- stopping supply of the first voltage to the system core block by a power management mechanism in the power control block according to a power saving mode setting signal from the CPU;
- entering a power saving mode;
- restoring the supply of the first voltage to the system core block according to a power saving mode release signal; and returning to a normal mode from the power saving mode;
- setting a predetermined communication signal to the power management mechanism by the CPU;
- detecting a communication signal on a communication port by an universal asynchronous receiver transmitter (UART) detector in the power management mechanism; and
- generating the power saving mode release signal when the detected communication signal is the predetermined communication signal set by the CPU.

8. A power control method for an integrated circuit, comprising:
- separating the integrate circuit in a chip to a system core block and a power control block, wherein the system core block is powered by a first voltage from a power supply and comprises a central processing unit (CPU), and the power control block is powered by a second voltage from the power supply;
- disposing a power management mechanism in the power control block;
- stopping supply of the first voltage to the system core block by a power management mechanism in the power control block according to a power saving mode setting signal from the CPU;
- entering a power saving mode;
- restoring the supply of the first voltage to the system core block according to a power saving mode release signal; and returning to a normal mode from the power saving mode;
- setting a predetermined synchronization signal or a predetermined television signal to the power management mechanism by the CPU;
- detecting a display control signal from outside of the integrated circuit by a synchronization signal detector in the power management mechanism;
- generating the power saving mode release signal when the detected display signal is the predetermined synchronization signal or the predetermined television signal set by the CPU.

9. A power control method for an integrated circuit, comprising:
- separating the integrate circuit in a chip to a system core block and a power control block, wherein the system core block is powered by a first voltage from a power supply and comprises a central processing unit (CPU), and the power control block is powered by a second voltage from the power supply;
- disposing a power management mechanism in the power control block;
- stopping supply of the first voltage to the system core block by a power management mechanism in the power control block according to a power saving mode setting signal from the CPU;
- entering a power saving mode;
- restoring the supply of the first voltage to the system core block according to a power saving mode release signal; and returning to a normal mode from the power saving mode;
- setting a predetermined code to the power management mechanism by the CPU;
- converting an analog input to a digital code by an analog-to-digital converter (ADC) in the power management mechanism; and
- generating the power saving mode release signal by a servo wake up unit in the power management mechanism the when the converted digital code from ADC is identical to the predetermined code set by the CPU.

* * * * *